US011696582B2

(12) United States Patent
Yarkoni

(10) Patent No.: US 11,696,582 B2
(45) Date of Patent: Jul. 11, 2023

(54) DURABLE PEST-REPELLING FORMULATIONS

(71) Applicant: Adhestick Innovations Ltd., Rosh HaAyin (IL)

(72) Inventor: Yair Yarkoni, Reut (IL)

(73) Assignee: Adhestick Innovations Ltd., Rosh HaAyin (IL)

( * ) Notice: Subject to any disclaimer, the term of this patent is extended or adjusted under 35 U.S.C. 154(b) by 253 days.

(21) Appl. No.: 16/640,359

(22) PCT Filed: Aug. 20, 2018

(86) PCT No.: PCT/IL2018/050919
§ 371 (c)(1),
(2) Date: Feb. 20, 2020

(87) PCT Pub. No.: WO2019/038760
PCT Pub. Date: Feb. 28, 2019

(65) Prior Publication Data
US 2020/0260725 A1    Aug. 20, 2020

(30) Foreign Application Priority Data

Aug. 20, 2017    (IL) .......................................... 254075

(51) Int. Cl.
*A01N 27/00*    (2006.01)

(52) U.S. Cl.
CPC .................... *A01N 27/00* (2013.01)

(58) Field of Classification Search
None
See application file for complete search history.

(56) References Cited

U.S. PATENT DOCUMENTS

| 3,306,817 | A |   | 2/1967  | Reinert et al. |              |
|-----------|---|---|---------|----------------|--------------|
| 4,693,889 | A |   | 9/1987  | Chirchirillo et al. |         |
| 4,822,614 | A |   | 4/1989  | Rodero         |              |
| 5,061,478 | A |   | 10/1991 | Yarkoni et al. |              |
| 6,166,118 | A | * | 12/2000 | Hyche ........................ | C08J 3/03 |
|           |   |   |         |                | 528/499 |
| 2007/0190094 | A1 |   | 8/2007  | Bessette    |              |
| 2009/0098303 | A1 | * | 4/2009  | Murphy ............... | C09D 129/04 |
|           |   |   |         |                | 106/270 |
| 2009/0297760 | A1 | * | 12/2009 | Arnoldt .................... | C09D 7/61 |
|           |   |   |         |                | 428/512 |
| 2012/0045497 | A1 |   | 2/2012  | Fowler et al. |              |
| 2016/0122607 | A1 | * | 5/2016  | Pernecker .................. | C09J 7/21 |
|           |   |   |         |                | 524/270 |
| 2016/0200916 | A1 | * | 7/2016  | Nishiguchi .......... | C09D 163/00 |
|           |   |   |         |                | 252/396 |

FOREIGN PATENT DOCUMENTS

| CA | 705016  | 3/1965 |
| CA | 1286985 | 7/1991 |
| CN | 101328394 | 12/2008 |
| EP | 0132965 | 2/1985 |
| EP | 1689237 | 2/2008 |
| EP | 2083619 | 4/2016 |
| ES | 291274  | 3/1964 |
| WO | WO 2008/053115 | 5/2008 |
| WO | WO 2008/134744 | 11/2008 |
| WO | WO 2016/106467 | 7/2016 |
| WO | WO 2019/038760 | 2/2019 |

OTHER PUBLICATIONS

International Preliminary Report on Patentability dated Mar. 5, 2020 From the International Bureau of WIPO Re. Application No. PCT/IL2018/050919. (7 Pages).
International Search Report and the Written Opinion dated Nov. 15, 2018 From the International Searching Authority Re. Application No. PCT/IL2018/050919. (11 Pages).
Office Action dated Feb. 12, 2018 From the Israel Patent Office Re. Application No. 254075. (3 Pages).
Substantial Examination and Search Report dated Feb. 28, 2022 From the Republica de Columbia Superintendencia de Industria y Comerciio Re. Application No. NC2020/0002673 and its English Translation. (18 Pages).
Examination Report Under Sections 12 & 13 of the Patents Act, 1970 and the Patents Rules, 2003 dated Jul. 22, 2021 From the Government of India, Intellectual Property India, Patents, Designs, Trade Marks, Geographical Indications, The Patent Office Re. Application No. 202027022431. (7 Pages).
Supplementary European Search Report and the European Search Opinion dated Jan. 4, 2022 From the European Patent Office Re. Application No. 18848138.6. (8 Pages).
Relatório de Busca e Parecer [Search Report and Opinion] dated Jun. 14, 2022 From the Serviço Público Federal, Ministério da Economia, Instituto National da Propriedade Industrial do Brasil Re. Application No. BRI 12020003505-0 and Its Translation Into English. (8 Pages).
Relatório de Busca e Parecer [Search Report and Opinion] dated Jan. 3, 2023 From the Serviço Público Federal, Ministério da Economia, Instituto National da Propriedade Industrial do Brasil Re. Application No. BRI 12020003505-0 and Its Translation Into English. (8 Pages).
Examination Report dated Oct. 21, 2022 From the Mexican Institute of Industrial Property Re. Application No. MX/a/2020/001978 with an English Translation. (14 pages).

(Continued)

*Primary Examiner* — Robert T. Crow
*Assistant Examiner* — John P Nguyen

(57) ABSTRACT

Formulations usable in repelling pests from objects are provided. The formulations contain a tacky polymeric composition and can be aqueous formulations and/or formulation that are devoid of an organic solvent. The formulations exhibit exceptional durability when applied to objects such as plants.

16 Claims, 3 Drawing Sheets

(3 of 3 Drawing Sheet(s) Filed in Color)

(56) References Cited

OTHER PUBLICATIONS

Technical Examination Report dated Jan. 3, 2023 from the National Institute of Industrial Property of Brazil Re. Application No. BR 12 2022 020580-1 with and Its Translation Into English. (8 pages).
Examination Report dated Mar. 6, 2023 From the Instituto Mexicano de la Propiedad Industrial, Secretaria de Economia, Direction Divisional de Patentes Re. Application No. MX/a/2020/001978 and Its Translation Into English. (16 pages).
Examination Report dated Feb. 21, 2023 From the Republica de Colombia, Superintendencia de Industria y Comercio Re. Application No. NC2022/0017678. (3 pages).
Translation dated Mar. 13, 2023 of Examination Report dated Feb. 21, 2023 From the Republica de Colombia, Superintendencia de Industria y Comercio Re. Application No. NC2022/0017678. (3 pages).

* cited by examiner

DURABLE PEST-REPELLING FORMULATIONS

RELATED APPLICATIONS

This application is a National Phase of PCT Patent Application No. PCT/IL2018/050919 having International filing date of Aug. 20, 2018, which claims the benefit of priority of Israel Patent Application No. 254075 filed on Aug. 20, 2017. The contents of the above applications are all incorporated by reference as if fully set forth herein in their entirety.

FIELD AND BACKGROUND OF THE INVENTION

The present invention, in some embodiments thereof, relates to insect control and, more particularly, but not exclusively, to formulations for repelling pests such as social insects (e.g., ants), which exhibit improved durability, and to methods employing same.

Insects cause considerable damage to plants, in both agriculture, and public and private lawns and gardens. For example, various species of ants cause significant damage to trees, growing crops and germinating seeds, and pose economic and health problems. Ants, such as fire ants, may also cause damage to substrates such as telephone and electrical wires.

In general, insects are typically removed from a specific locus with an insecticide. However, the use of insecticides causes several major concerns. Most insecticide formulations pose a significant threat to the environment, for being toxic to plants and animals, including humans, particularly when applied to large areas. The use of insecticides further poses environmental concerns as it can result in contamination of agricultural products, possible contamination of ground water, etc. Further, insecticides typically do not discriminate between harmful and useful insects which might be exposed to the insecticide. Moreover, the high reproductivity and developments of resistance to commonly used insecticides render these agents less effective and require ongoing development of new insecticides.

One alternative approach to the use of insecticides for controlling certain insects is the use of attractants or repellents. Such agents are particularly useful against social insects (e.g., ants, wasps, termites, and the like) which communicate with others of their species and with their environment largely through behaviorally active chemicals. Some of the chemicals cause repellency or inhibition of ongoing behavior and others cause attraction. For example, alarm compounds released from an ant which is injured or attacked may cause a variety of specific behaviors, including repellency, in nearby ants of the same species.

Insect repellents typically form a barrier between the insects and a specific site where the insects are not to enter, and are therefore also referred to in the art as "insect barrier" or "insect barricade".

Such agents can be applied to surfaces of plants and other animate and non-animate objects which are prone to insect attacks, and reduce or prevent the damage caused to these objects.

While the use of repellents for agricultural and/or household insect management provides several advantages over the use of insecticides, particularly since it avoids the development of resistance, the use of currently known repellents is limited by a loss of substantial activity over time, due, for example, to chemical and/or physical instability under environmental conditions (e.g., humidity, precipitations, extreme temperatures, oxidation, etc.). Moreover, most of the currently known repellents are considered as hazardous materials, being unsafe for the use and/or environmentally unfriendly.

For an insect repellent to be effective, it should withstand environmental conditions for a prolonged time period.

U.S. Pat. No. 5,061,478 discloses sprayable bird and pest repellent compositions which comprise a tacky polyolefin, a thixotropic agent and an organic solvent. Additional background art includes U.S. Pat. Nos. 3,306,817, 4,822614 and 4,693,889, and EP Patent Application Nos. 84109216.6 and 87101049.2

SUMMARY OF THE INVENTION

According to an aspect of some embodiments of the present invention there is provided a formulation comprising a tacky polymeric composition, an emulsifying agent or system and water, wherein an amount of the water is at least 20 weight percents of the total weight of the formulation, and wherein a weight ratio of the polymer and the surface active agent is at least 10:3

According to some of any of the embodiments described herein, the tacky polymeric composition comprises or consists of a tacky polymer.

According to some of any of the embodiments described herein, the tacky polymer is a polyolefin.

According to some of any of the embodiments described herein, the polyolefin is a polybutene.

According to some of any of the embodiments described herein, an amount of the tacky polymeric composition ranges from 50 to 79.9 weight percents of the total weight of the formulation.

According to some of any of the embodiments described herein, the tacky polymeric composition is characterized by tackiness of at least 400 $N/m^2$ or at least 450 $N/m^2$ or at least 480 $N/m^2$.

According to some of any of the embodiments described herein, an amount of the emulsifying agent or system ranges from 0.1 to 27 weight percents, of the total weight of the formulation.

According to some of any of the embodiments described herein, the emulsifying agent or system is or comprises a non-ionic emulsifying agent.

According to some of any of the embodiments described herein, the emulsifying agent or system comprises a fatty acid.

According to some of any of the embodiments described herein, the emulsifying agent or system features an HLB value lower by at least 5% or by at least 10%, or by at least 20%, from the HLB value required for forming a stable formulation of the tacky polymeric composition and water.

According to some of any of the embodiments described herein, the emulsifying agent or system features an HLB value lower than 15.

According to some of any of the embodiments described herein, the formulation further comprises a thixotropic agent.

According to some of any of the embodiments described herein, an amount of the thixotropic agent ranges from 0.1 to 2 weight percents.

According to some of any of the embodiments described herein, the formulation further comprises at least one additional agent selected from a pH adjusting agent, a preservative, a stabilizer, an anti-foaming agent, a dispersing agent, an anti-oxidant, a UV-stabilizer, an anti-sagging agent, a surface active agent, a plasticizer and a coalescence agent.

According to some of any of the embodiments described herein, the formulation is in a form of an aqueous dispersion.

According to some of any of the embodiments described herein, the formulation is packaged in a packaging container configured for dispensing the formulation onto a surface of a substrate.

According to some of any of the embodiments described herein, the formulation is configured for dispensing by smearing or brushing the formulation onto the surface.

According to some of any of the embodiments described herein, the formulation is characterized by a viscosity that ranges from 15000 to 40000 centipoises.

According to some of any of the embodiments described herein, the formulation is configured for dispensing by spraying the formulation onto the surface.

According to some of any of the embodiments described herein, the formulation is characterized by a viscosity that ranges from 100 to 15000 centipoises.

According to an aspect of some embodiments of the present invention there is provided a formulation as described herein in any of the respective embodiments and any combination thereof, for use in repelling a pest from an object.

According to some of any of the embodiments described herein, the pest is an insect.

According to some of any of the embodiments described herein, the pest is a social insect.

According to some of any of the embodiments described herein, the pest is an ant.

According to some of any of the embodiments described herein, the object is a plant.

According to some of any of the embodiments described herein, the object is a tree.

According to some of any of the embodiments described herein, the tree is aged at least one month.

According to some of any of the embodiments described herein, the repelling is effected by applying the formulation on a surface of the object by brushing or smearing, and wherein an amount of the formulation ranges from 0.01 to 1, or from 0.01 to 0.5, or from 0.05 to 0.5, or from 0.04 to 0.2, or from 0.1 to 0.25, or from 0.15 to 0.2, grams per square cm of the surface.

According to some of any of the embodiments described herein, the repelling is effected by applying the formulation on a surface of the object by spraying, and wherein an amount of the formulation ranges from 0.01 to 1, or from 0.01 to 0.5, or from 0.01 to 0.3, or from 0.04 to 0.3, grams per square cm of the surface.

According to an aspect of some embodiments of the present invention there is provided a method of repelling a pest from an object, the method comprising applying the formulation as described herein in any of the respective embodiments and any combination thereof on a surface of the object and/or near at least a portion of the object.

According to some of any of the embodiments described herein, the pest is an insect.

According to some of any of the embodiments described herein, the insect is a social insect.

According to some of any of the embodiments described herein, the insect is an ant.

According to some of any of the embodiments described herein, the object is a plant.

According to some of any of the embodiments described herein, the object is a tree.

According to some of any of the embodiments described herein, the plant is aged at least one month.

According to some of any of the embodiments described herein, the method further comprises re-applying the formulation after a first time period, the first time period being at least 1 month.

According to some of any of the embodiments described herein, a polymeric film formed upon applying the formulation is characterized as remaining adhered to the surface for at least one month, when subjected to environmental conditions.

According to some of any of the embodiments described herein, applying the formulation to the surface is by brushing or smearing.

According to some of any of the embodiments described herein, an amount of the applied formulation ranges from 0.01 to 1, or from 0.01 to 0.5, or from 0.05 to 0.5, or from 0.04 to 0.3, or from 0.1 to 0.25, or from 0.15 to 0.2, grams per square cm of the surface.

According to some of any of the embodiments described herein, applying the formulation to the surface is by spraying.

According to some of any of the embodiments described herein, an amount of the applied formulation ranges from 0.01 to 1, or from 0.01 to 0.5, or from 0.01 to 0.3, or from 0.04 to 0.3, grams per square cm of the surface.

According to an aspect of some embodiments of the present invention there is provided a formulation comprising a tacky polymeric composition and a thixotropic agent, for use in repelling a pest from a plant.

According to some of any of the embodiments described herein, the formulation is devoid of an organic solvent.

According to some of any of the embodiments described herein, the pest is an insect.

According to some of any of the embodiments described herein, the pest is a social insect.

According to some of any of the embodiments described herein, the pest is an ant.

According to some of any of the embodiments described herein, the plant is a tree.

According to some of any of the embodiments described herein, the repelling is effected by applying the formulation on a trunk of the plant.

According to some of any of the embodiments described herein, the applying is by brushing or smearing, and wherein the formulation is configured for dispensing by the brushing or smearing.

According to some of any of the embodiments described herein, the applying is by spraying, and wherein the formulation is configured for dispensing by the spraying.

According to an aspect of some embodiments of the present invention there is provided a method of repelling a pest from a plant, the method comprising applying a formulation comprising a tacky polymeric composition and a thixotropic agent on a trunk of the plant.

According to some of any of the embodiments described herein, the formulation is devoid of an organic solvent.

According to some of any of the embodiments described herein, the pest is an insect, for example, a social insect, for example, an ant.

According to some of any of the embodiments described herein, the plant is a tree.

According to some of any of the embodiments described herein, the method according to these embodiments further comprises re-applying the formulation after a first time period, the first time period being at least 1 month.

According to some of any of the embodiments described herein, a polymeric film formed upon applying the formulation is characterized as remaining adhered to the surface for at least one month, when subjected to environmental conditions.

According to some of any of the embodiments described herein, applying the formulation to the trunk of the plant is by brushing or smearing.

According to some of any of the embodiments described herein, applying the formulation to the surface is by spraying.

According to some of any of the embodiments described herein, an amount of the applied formulation ranges from 0.01 to 0.2, or from 0.01 to 0.15, or from 0.02 to 0.15, or from 0.04 to 0.15 grams, per square cm of the trunk.

According to some of any of the embodiments described herein, the tacky polymeric composition comprises or consists of a tacky polymer.

According to some of any of the embodiments described herein, the tacky polymer is a polyolefin.

According to some of any of the embodiments described herein, the polyolefin is a polybutene.

According to some of any of the embodiments described herein, a concentration of the thixotropic agent ranges from 1 to 10 percents by weight, of the total weight of the formulation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

Figure 1:
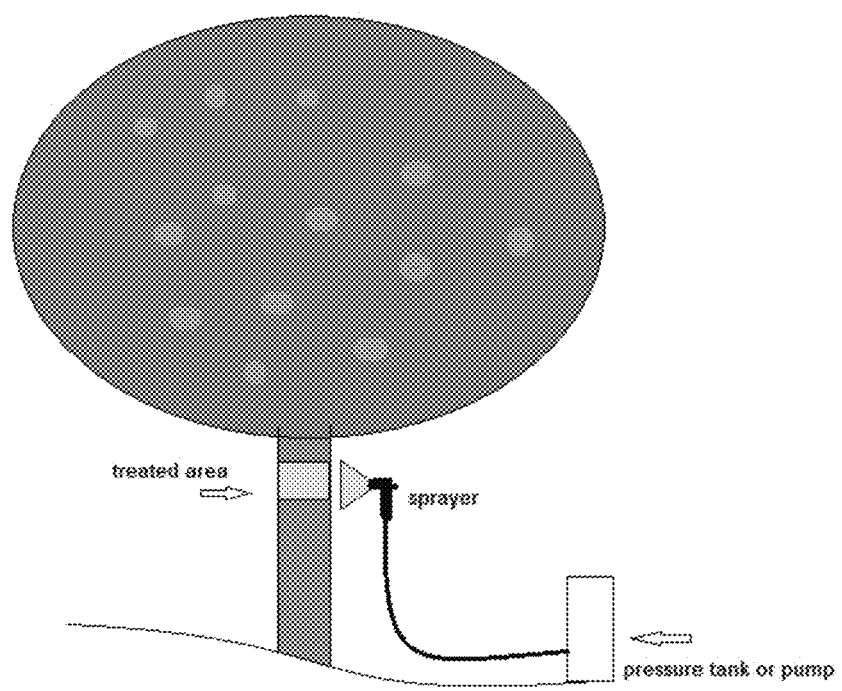

FIG. 1 presents a schematic illustration showing an exemplary mode of application of a formulation according to some embodiments of the present invention.

Figure 2A:
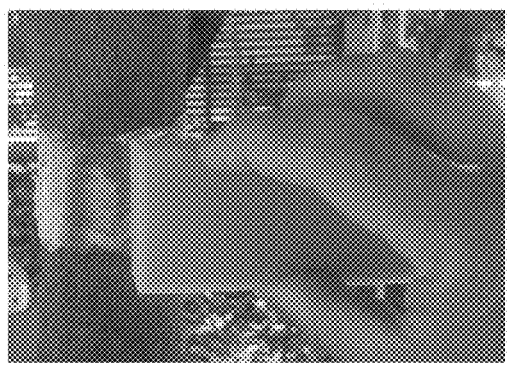
Figure 2B:

FIGS. 2A-B present photographs showing an exemplary mode of application of a formulation according to some embodiments of the present invention to the trunk of a lemon tree, using a sponge (FIG. 2A), and the film obtained thereupon (FIG. 2B).

Figure 3A:
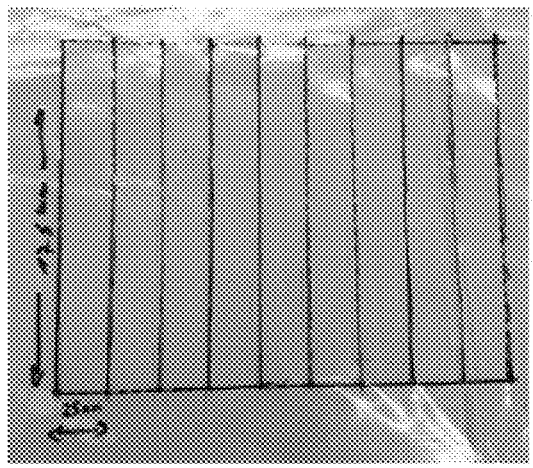
Figure 3B:
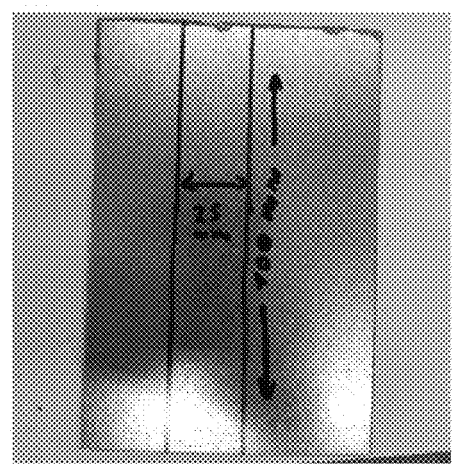
Figure 3C:
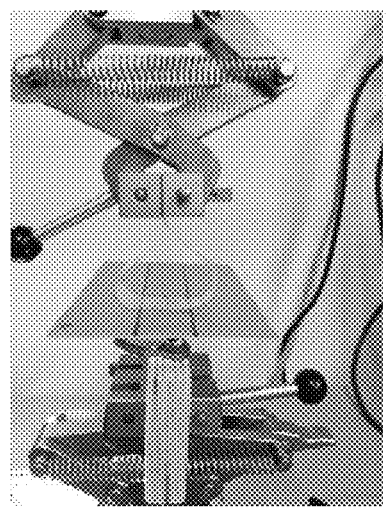

FIGS. 3A-C present photographs showing an exemplary experimental set-up usable in determining a tackiness of a formulation as described herein, according to ASTM D6195.

Figure 4A:
Figure 4B:
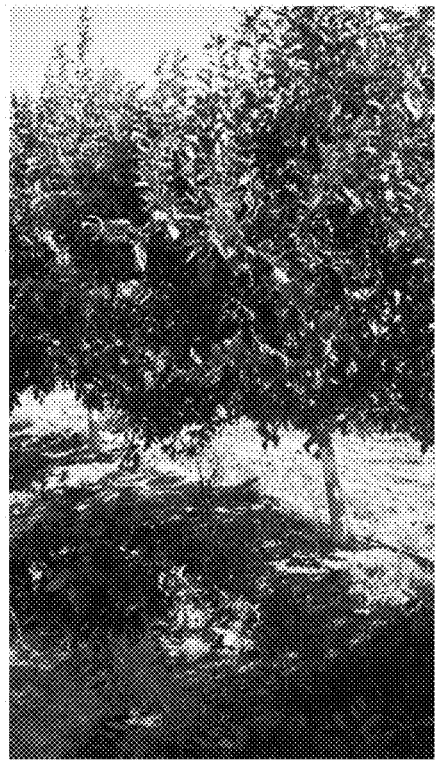
Figure 4C:
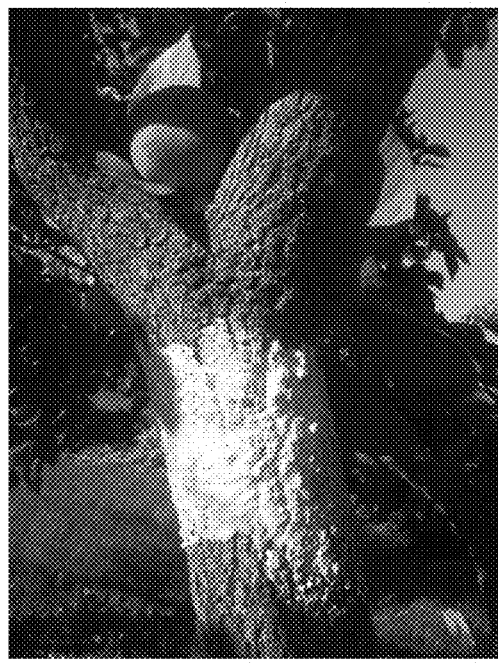

FIGS. 4A-C present photographs of a lemon tree (FIGS. 4A and 4B), and a persimmon tree (FIG. 4C), having an exemplary formulation according to some embodiments of the present invention applied thereon.

DESCRIPTION OF SPECIFIC EMBODIMENTS OF THE INVENTION

The present invention, in some embodiments thereof, relates to insect control and, more particularly, but not exclusively, to formulations for repelling pests such as insects (e.g., ants), which exhibit improved durability, and to methods employing same.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As discussed hereinabove, current methodologies for controlling pests such as insects involve using pesticides, which are environmentally hazardous, toxic to plants and animals, and are further characterized by decreasing efficacy due to developments of resistance thereto. Alternative methodologies, which use pest repellents, are typically characterized by insufficient durability to environmental conditions (e.g., precipitations, humidity), require frequent repeated applications (e.g., due to decreased efficiency over time). Most of the currently known pest repellents are also considered environmentally hazardous and phytotoxic.

In a search for improved formulations for controlling pests, the present inventors have designed and successfully practiced a novel formulation for repelling pests such as insects, which was found particularly useful as ant repellent when applied to trees and other agricultural products. The newly designed formulations exhibit high repellent efficacy, and are further characterized by exceptional durability even under extreme environmental (e.g. temperature and humidity) conditions. Thus, the newly designed formulations remain stable and adhered to a substrate to which they are applied for a time period of at least one, two, or three months, and even for longer time periods, thus avoiding frequently repeated applications.

The newly designed formulations are preferably devoid of organic solvents, thus rendering the preparation and use of these formulations user-friendly and environmentally non-hazardous, when applied to plants, and allow safe transportation, storage and handling while circumventing the need to use means required for hazardous products.

The newly designed formulations are therefore non-toxic, environment- and user-friendly and feature exceptional durability and repellence efficacy.

Some of the newly designed formulations are aqueous formulations and include a tacky polymer or a tacky polymeric composition, water and an emulsifying agent. Once applied to a surface of a substrate from which pests (e.g., insects) should be repelled, these formulations form, upon evaporation of the water, a transparent tacky film which prevents the pests from contacting the substrate. These formulations are characterized by viscosity which enables direct application onto the substrate's surface, prior to the rapid formation of a film which stably adheres to the substrate's surface. Although being aqueous, these formulations are non-washable when exposed to water upon irrigation, or to environmental humidity and/or precipitation, and are also stable when exposed to sun or any other heat and/or light source.

Without being bound by any particular theory, it is assumed that the emulsifying agent enables formulating the tacky polymeric composition in an aqueous solution, whereby once the water evaporates upon application, the tacky polymeric composition forms an adhesive film, and the emulsifying agent is no longer active and does not promote further interaction with an external water source.

The use of an aqueous dispersion of the tacky polymeric composition allows incorporating in the formulation a high concentration of the tacky polymeric composition, without adversely affecting its rheological properties, thus providing higher efficacy compared to organic formulations which comprise a substantial concentration of organic solvents.

Other newly designed formulations comprise a tacky polymeric composition and a thixotropic agent and are devoid of volatile substances, including water.

The newly designed formulations are particularly useful for application on tree trunks, yet can be used for repelling pests from other loci, including animate and non-animate objects, as is detailed hereinbelow.

The newly designed formulations are useful in controlling social insects such as ants, termites and wasps. The tackiness of the applied formulation is sensed by the insects upon contacting and/or nearing the formulation and imparts an insecure sensation which deters subsequent attempts.

Embodiments of the present invention relate to novel aqueous pest-repelling formulations and to uses thereof in repelling pests such as insects from an object which is prone to pest infestation.

Embodiments of the present invention further relate to utilizing a non-aqueous formulation for repelling pests such as insects from plants.

The aqueous formulation:

According to an aspect of some embodiments of the present invention there is provided pest repelling formulation (e.g., an insect repelling formulation) which comprises a tacky polymeric composition, water and an emulsifying agent.

According to some of any of the embodiments described herein, water is present in the formulation in an amount of at least 20 weight percents of the total weight of the formulation, and can be, for example, in an amount ranging from 20 to 30 weight percents, including any intermediate value and subranges therebetween.

In some of any of the embodiments described herein, the formulation is devoid of an organic solvent.

By "devoid of" it is meant that an amount of an organic solvent is no more than 2%, or no more than 1%, or no more than 0.5%, or no more than 0.1%, or no more than 0.5%, or no more than 0.1%, or no more than 0.05%, or no more than 0.01%, by weight, and can be even less or null.

In the context of these embodiments, an organic solvent encompasses one or more of saturated and unsaturated aliphatic hydrocarbons, aromatic hydrocarbons, saturated and unsaturated alicyclic hydrocarbons, saturated and unsaturated halogenated hydrocarbons, aliphatic alcohols, ethers, esters and ketones.

According to some of any of the embodiments described herein, the formulation is such that forms a polymeric film once water evaporates therefrom. The polymeric film comprises the tacky polymeric composition, the emulsifying agent and any other non-volatile component present in the formulation, other than water.

According to some of any of the embodiments described herein, a weight ratio of the polymeric composition and the emulsifying agent is such that is sufficient to promote a formation of, and/or stabilize, a dispersion of the polymer in an aqueous solution, yet is insufficient to promote interactions between the polymeric film formed once water evaporates from the formulation and an external water source, that is, is insufficient to allow dispersion of the polymeric film in water or an aqueous solution, when the polymeric film contacts water or an aqueous solution.

In some embodiments, a weight ratio of the tacky polymeric composition and the emulsifying agent is at least 10:3, or at least 10:2 (5:1), such that the weight of the emulsifying agent is no more than ⅓ of the weight of the tacky polymeric composition in the formulation. In some embodiments, a weight ratio of the tacky polymeric composition (e.g., the tacky polymers) and the emulsifying agent is 3:1, 5:1, 6:1, 7:1, 8:1, 9:1, and is preferably 10:1, 11:1, 12:1, 13:1, 14:1, 15:1, 16:1, 17:1, 18:1, 19:1, 20:1, 50:1 or higher.

Herein throughout, and in the art, the term "tacky" is also referred to as "adhesive" or "sticky", and describes a property of being cohesive and sticky. Tacky materials are typically capable of adhering to solid surfaces, and, while being adhered to surfaces, are capable of further adhering objects thereto.

Tackiness, or adhesiveness, of a material or a composition can be determined as the work or force necessary to overcome the attractive forces between the tacky material or composition and a surface to which it is adhered. There are several assays known in the art to determine tackiness of materials or compositions.

In some of any of the embodiments described herein, a tacky polymeric composition or a tacky polymer is defined as a polymeric composition characterized by a tackiness of at least 400 N/m$^2$ or at least 450 N/m$^2$ or at least 480 N/m$^2$, when determined by a loop tack strength test according to AS™ D6195. An exemplary assay is described in the Examples section that follows.

In some of any of the embodiments described herein, a tacky polymeric composition is defined as a polymeric composition characterized by a tackiness that ranges from about 400 N/m$^2$ to about 3000 N/m$^2$, of from about 480 N/m$^2$ to about 2400 N/m$^2$ including any intermediate values and subranges therebetween, or, for example, of about 480 N/m$^2$, or of about 500 N/m$^2$, or of about 800 N/m$^2$, or of about 1000 N/m$^2$ or of about 1500 N/m$^2$ or of about 2000 N/m$^2$, when determined by a loop tack strength test according to AS™ D6195.

Herein throughout, the phrase "tacky polymeric composition" encompasses a tacky polymeric material, as defined herein, per se, or a composition comprising a polymeric material (including a tacky polymeric material) and one or more additives which may provide the composition with the above-mentioned tackiness when combined with the selected polymeric material.

Such additives include, for example, a plasticizer and/or a tackifying agent. Non-limiting examples include low molecule weight polyolefin (e.g., polybutene having MW of from 300 to 800, or from 300 to 500, grams/mol), chloro-substituted paraffin, paraffin oil or wax, Naphthenic oil, Aromatic oil, Phthalate-based plasticizers (e.g., 1,2-Cyclohexane dicarboxylic acid d-isononyl ester, Bis(2-propylheptyl)phthalate), Hexamol Dinch, Emulten, petroleum gel, low melting point wood rosin, polyethylene wax, bitumen, polyterpene resin, terpene phenolic resin (for example, a material marketed as DERMULSENE DT by DRT), aliphatic or aromatic hydrocarbon resin, Triethylene glycol ester of gum rosin, such as, for example, marketed as YT 342 by YSER, and low softening point or liquid resins such as resins available as a dispersion in an acidic aqueous solution or as dispersible solids which feature a softening point of at least 70, such as, for example, those marketed as MEGATAC MP81, P 750 (by YSER), and Pine rosins 257.2 (by Pine rosins).

By "softening point" it is meant the temperature at which a bitumenius material softens. It can be determined, for example, by the Vicat method (ASTM-D1525 or ISO 306), Heat Deflection Test (ASTM-D648) or a ring and ball method (ISO 4625 or AS™ E28-67/E28-99 or AS™ D36 or AS™ D6493-11).

The phrase "polymeric material" encompasses homopolymers, copolymers, and a mixture of two or more of homopolymers, two or more copolymers or of one or more homopolymer and one or more copolymer. Exemplary polymeric materials which are usable in the context of the present embodiments, as tacky polymeric materials or as part of a tacky polymeric composition, include, but are not limited to, polyolefins, particularly polymers or copolymers of olefins having 3 or 4 carbon atoms, such as polypropylene, polybutenes (polybutylene), and polyisobutylene (polyisobutene).

Additional, non-limiting, examples of usable (e.g., tacky) polymeric materials include polyacrylates, butyl rubber, polyisoprene, natural rubber—solid or latex, SIS—styrene isoprene styrene, SBS—styrene butadiene styrene, SEBS—styrene ethylene butylene styrene, vinyl acrylate, vinyl acetate, and polyurethanes.

The phrase "tacky polymeric material" is also referred to herein interchangeably as "tacky polymer".

In some embodiments, the tacky polymeric composition comprises or consists of a tacky polymeric material, as described herein.

In some embodiments, the tacky polymeric material is a polyolefin as described herein.

Tacky polymeric materials as described herein are typically polymers of high molecular weight, for example, of a molecular weight of at least 1,000 Daltons or of at least 1,500 Daltons, or of at least 2,000 Daltons In exemplary embodiments, the tacky polymeric material is a polybutene, preferably a polybutene having a molecular weight of at least 2,000 Daltons, e.g., of about 2,300 Daltons.

In some embodiments, the tacky polymeric composition comprises a polymer, including a tacky polymeric material as described herein, and a plasticizer.

Exemplary polymeric compositions which provide a tackiness as defined herein include, but are not limited to, the following:

a polybutene having a molecular weight of at least 2,000 Daltons, e.g., of about 2,300 Daltons (also referred to herein as butyl rubber), and a low molecular weight polybutenes as defined herein, at a ratio of, for example, 2:1;

Isoprene rubber and paraffin oil, at a ratio of, for example, 2:1;

Butadiene rubber and Paraffin oil and Wood rosin, at a ratio of, for example, 2:1:1;

Polyacrylate and a liquid resin as described herein and a phthalate plasticizer (e.g., as described herein), at a ratio of, for example, 2:1:3;

A styrene-isoprene-styrene rubber and paraffin oil and Wood Rosin, at a ratio of, for example, 2:2:1; and Styrene-Butadiene-Styrene (SBS) rubber and paraffin oil and Wood rosin, at a ratio of, for example, 2:2:1.

Other suitable compositions are also contemplated. Those skilled in the art can readily determine compositions that qualify as tacky polymeric compositions as described herein (for example, by using the assay as described herein for determining tackiness).

In some of any of the embodiments described herein, an amount of the tacky polymeric material (e.g., a polyolefin such as described herein) or a tacky polymeric compositions (e.g., as described herein) is at least 40, preferably at least 50, more preferably at least 60, weight percents of the total weight of the formulation.

In some of any of the embodiments described herein, an amount of the tacky polymeric material or a tacky polymeric composition ranges from about 40 to about 79, or from about 50 to about 79, or from about 60 to about 79, or from about 60 to about 75, or from about 60 to about 70, weight percents of the total weight of the formulation, including any intermediate value and subranges therebetween.

In some of any of the embodiments described herein, an amount of the emulsifying agent is such that meets a weight ratio to the tacky polymer as described herein.

In some of any of the embodiments described herein, an amount of the emulsifying agent ranges from about 0.1 to about 33, or from about 0.1 to about 20, Or from about 0.1 to about 16, or from about 1 to about 16, or from about 1 to about 8, or from about 1 to about 5, or from about 2 to about 5, weight percents, of the total weight of the formulation, including any intermediate values and subranges therebetween.

As used herein, the phrase "emulsifying agent" is also referred to as "emulsifier" and describes a chemical substance that acts as a stabilizer for emulsions, preventing liquids that are immiscible with one another from separating, typically by increasing the kinetic stability of the emulsion by e.g., lowering the interfacial tension between the liquids.

Emulsifying agents typically have a lipophilic group and a hydrophilic group, and can be categorized as ionic (e.g., cationic, anionic or zwitterionic) or non-ionic agents.

Representative examples of non-ionic agents that are usable in the context of the present embodiments include, without limitation, polyethoxylated alkyl phenols, polyethoxylated glyceryl esters, and polyethoxylated organic ethers derived from fatty acids, including, but not limited to, polysorbate 60, ethoxylated sorbitan stearate, ethoxylated sorbitan palmitate, ethoxylated sorbitan oleate, fatty alcohol ethoxylates, polyoxyethylene (POE) alkyl ethers, branched oxoalcohol C11 with 5 mol EO, and any combinations thereof.

Examples of anionic surface active agents include, but are not limited to, alkyl phosphate, alkyl carboxylate, alkyl sulfate, and alkyl sulfonate type surfactants, including, for example, free organic (e.g., fatty) acids, organic phosphate esters, α-olefinsulfonate and its salts, and alkali salts of sulfosuccinic acid half-esters (e.g., dioctyl ester of sodium sulfosuccinic acid).

Some exemplary anionic surfactants include, but are not limited to, Alginic acid sodium salt, ALKANOL® 189-S, Capstone® FS-66, Glycolic acid ethoxylate 4-tert-butylphenyl ether, Glycolic acid ethoxylate lauryl ether, Glycolic acid ethoxylate lauryl ether, Glycolic acid ethoxylate lauryl ether, Glycolic acid ethoxylate 4-nonylphenyl ether, Glycolic acid ethoxylate oleyl ether, Poly(ethylene glycol) 4-nonylphenyl 3-sulfopropyl ether potassium salt, Zonyl® FSA fluorosurfactant 25 wt. % Li carboxylate salt in water:isopropyl alcohol (1:1), and Zonyl® UR fluorosurfactant.

Examples of cationic surface active agents include, but are not limited to, long-chained quaternized ammonium compounds, for example, behenyl trimethyl ammonium chloride, benzyl tetradecyl-dimethyl-ammonium chloride, cetyl pridinium chloride, cetyl trimethyl ammonium chloride, dimethyl dihydrogenated-tallow ammonium chloride, dimethyl stearyl ammonium chloride, dimethyl-stearyl benzyl ammonium chloride, lauryl dimethylbenzyl ammonium chloride, lauryl-trimethyl-ammonium chloride, stearyl trimethyl ammonium chloride, trimethylacetyl-ammonium bromide, and tris-(oligooxy-ethyl)alkylammonium phosphate.

Examples of zwitterionic surface active agents include betaines (such as fatty acid-amidoalkylbetaine and sulfobetaine) and long-chained alkylamino acids (such as cocoaminoacetate, cocoamino-propionate, sodium cocoamphopropionate and sodium cocoamphoacetate).

Table 1 below lists exemplary surface active agents that are usable in the context of the present embodiments, and an exemplary vendor thereof.

TABLE 1

| Material | Vendor |
|---|---|
| Polysorbate | Sigma aldrich |
| Tween ® | Sigma aldrich |
| Dilaureth-7 citrate | Sigma aldrich |
| Glyceryl Oleate Citrate | Sigma aldrich |
| Monoglycerides | Sigma aldrich |
| Monoglycerides | Sigma aldrich |
| Acetylated Monoglycerides | Sigma aldrich |
| Lactylated Monoglycerides | Sigma aldrich |
| Citrated Monoglycerides | Sigma aldrich |
| Succinylated Monoglycerides | Sigma aldrich |
| Oleic acid | Sigma aldrich |
| Polyglycerol polyricinoleate | Radiamuls ® Poly 2253K (Oleon) |
| PS750-C | Sisterna ® |
| L70-C | Sisterna ® |
| SP30-C | Sisterna ® |
| Glycomul | Lunza |
| Lecithin | Sigma aldrich |
| Dimodan ® Distilled Monoglycerides | |
| PANODAN ® DATEM (DIACETYL TARTARIC ACID ESTERS) | Gillco |
| GRINDSTED ™ ACETEM (ACETIC ACID ESTERS OF MONOGLYCERIDES) | Gillco |
| GRINDSTED ™ CITREM (CITRIC ACID ESTERS OF MONOGLYCERIDES) | Gillco |
| GRINDSTED ™ LACTEM (LACTIC ACID ESTERS OF MONOGLYCERIDES) | Gillco |
| GRINDSTED ™ MONO-DI (MONO AND DIGLYCERIDES) | Gillco |

TABLE 1-continued

| Material | Vendor |
|---|---|
| GRINDSTED ™ PGE OR PGPR (POLYGLYCEROL ESTERS OF FATTY ACIDS, POLYGLYCEROL POLYRICINOLEATE) | Gillco |
| GRINDSTED ™ STS OR SMS (SORBITAN TRISTEARATE, SORBITAN MONOSTEARATE) | Gillco |
| GRINDSTED ™ STS OR SMS (SORBITAN TRISTEARATE, SORBITAN MONOSTEARATE) | Gillco |

In some of any of the embodiments described herein, the emulsifying agent is a non-ionic agent.

Non-ionic emulsifying agents can further be categorized as hydrophobic or hydrophilic and are typically characterized by a hydrophilic-lipophilic balance (HLB) value, which is determined by calculating values for the different regions of the molecule.

In some embodiments, emulsifying agents usable in the context of the present embodiments are selected in accordance with their HLB value as determined by the Davies' method [Davies J T (1957), Proceedings of the International Congress of Surface Activity, pp. 426-38].

In some of any of the embodiments described herein, the emulsifying agent is such that exhibits an HLB value that is lower from the HLB value recommended (e.g., in the art) for a stable emulsion of the tacky polymeric composition in an aqueous solution (e.g., water) at the selected concentration.

In some embodiments, the HLB of the emulsifying agent is lower by 5-50%, or by 10-50%, including any intermediate from the HLB value recommended for providing a stable emulsion of a selected tacky polymeric composition, as described herein.

In some embodiments, the HLB value of the emulsifying agent is lower by 5%, or by 8%, or by 10%, or by 12%, or by 15%, or by 20%, or by 22%, or by 25%, or by 28%,k or by 30%, or by 32%, or by 35%, or by 38%, or by 40%, and even lower, e.g., by 50%, from the HLB value recommended for providing a stable emulsion of a selected tacky polymeric composition, as described herein.

In some of any of the embodiments described herein, the emulsifying agent is selected as a non-phytotoxic surface active agent.

In some of any of the embodiments described herein, the emulsifying agent is actually an emulsifying system which comprises two or more emulsifying agents.

In some of these embodiments, the emulsifying system is selected as featuring an HLB as described herein in any of the respective embodiments, e.g., an HLB value that is lower than the recommended value for a selected tacky polymeric composition.

Any two or more of the emulsifying agents described herein can be combined for forming the emulsifying system. In some embodiments, the emulsifying system comprises two or more of the agents presented in Table 1.

In some embodiments, the emulsifying agent or system comprises a fatty acid. Exemplary fatty acids usable in the context of present embodiments include, but are not limited to, saturated and unsaturated fatty acids such as linoleic acid, γ-linoleic acid, palmitoleic acid, elaidic acid, erucic acid, and nervonic acid. Unsaturated fatty acids include fatty acids with one or more double bonds, and each bond can feature a cis or trans configuration.

In some of any of the embodiments described herein, an amount of the fatty acid ranges from 0.05 to 5, or from 0.5 to 5, or from 0.5 to 3, or from 1 to 5, or from 1 to 3, of the total weight of the formulation, including any intermediate value and subranges therebetween.

In some of any of the embodiments described herein the emulsifying agent is an emulsifying system that comprises a non-ionic agent such as, for example, one or more of polyethoxylated alkyl phenols, polyethoxylated glyceryl esters, and polyethoxylated organic ethers derived from fatty acids, including, but not limited to, polysorbate 60, ethoxylated sorbitan stearate, ethoxylated sorbitan palmitate, ethoxylated sorbitan oleate, fatty alcohol ethoxylates, polyoxyethylene (POE) alkyl ethers, branched oxoalcohol C11 with 5 mol EO, and one or more fatty acids.

In some of these embodiments, an amount of the fatty acid ranges from 0.05 to 5, or from 0.5 to 5, or from 0.5 to 3, or from 1 to 3, or from 1 to 2, of the total weight of the formulation, including any intermediate value and subranges therebetween, and the amount of the other one or more emulsifying agents is determined in accordance with the weight ratio of the emulsifying system and the tacky polymeric composition, as described herein, and/or in accordance with the HLB value (being lower than recommended) as described herein.

In exemplary embodiments, the tacky polymeric composition consists of or comprises a high MW polyolefin, as described herein, and in some embodiments, it is a high MW polybutene. For obtaining stable aqueous emulsions of such tacky polymers, it is typically recommended to use an emulsifying agent or system that exhibits an HLB value higher than 15 (e.g., 17).

In exemplary embodiments, the formulation of the present embodiments comprises an emulsifying agent or system exhibiting HLB value which is lower than 15, and which is, for example, 14, 13 or 12.

In exemplary embodiments, such an emulsifying agent or system is or comprises a polyoxyethylene (POE) alkyl ether, preferably a nonyl phenol ethoxylate such as NP-6 (Nonylphenol ethoxylate, 6 ethyleneoxide units). In exemplary embodiments, the emulsifying agent or system further comprises a fatty acid, for example, oleic acid.

According to some of any of the embodiments described herein, the formulation comprises water, polybutene, and a nonyl phenol ethoxylate.

According to some of any of the embodiments described herein, the formulation comprises water, polybutene, a nonyl phenol ethoxylate and a fatty acid (e.g., oleic acid).

According to some of these embodiments, the polybutene has a molecular weight of about 2300 Daltons.

According to some of these exemplary embodiments, an amount of the polybutene is 50-70 (e.g., about 67) weight percents, an amount of the nonyl phenol ethoxylate is about 3.9-4 weight percents, and the balance being water and optionally organic fatty acid, a pH adjusting agent and/or any of the other additional substances as described herein. Such a formulation is suitable for application via brushing or smearing, as discussed in further detail hereinafter.

According to some of these exemplary embodiments, an amount of the polybutene is 50-70 (e.g., about 55) weight percents, an amount of the nonyl phenol ethoxylate is 6-15 (e.g., about 13) weight percents, and the balance being water and optionally organic fatty acid, a pH adjusting agent and/or any of the other additional substances as described herein. Such a formulation is suitable for application via spraying, as discussed in further detail hereinafter.

In some of any of the embodiments described herein, the formulation further comprises a pH adjusting agent, preferably an alkaline substance (also referred to herein as an alkalizing agent), for adjusting the pH of the formulation to from about 6 to about 9, or from about 6.5 to about 8.5.

Suitable alkalizing agents include, for example, sodium carbonate, calcium carbonate, potassium carbonate, potassium bicarbonate, ammonia (e.g., ammonium hydroxide), ammonium carbonate, diethanolamine, monoethanolamine, triethanolamine, potassium hydroxide, magnesium hydroxide, sodium hydroxide, sodium borate, sodium phosphate dibasic and trolamine. Food acids and bases such as allantoin, bisabolol, Pyroglutamic acids and salts thereof are also suitable.

In some embodiments, the alkalizing agent is a volatile substance, as defined herein. Exemplary such agents include, as non-limiting examples, ammonia, diethanolamine, triethanolamine, monoethanolamine, trolamine and bisabolo.

The amount of the alkalizing agent is selected so as to achieve the desired pH, preferably without damaging emulsion stability, and can be determined by any person skilled in the art.

In some embodiments, the alkalizing agent is introduced to the formulation as an alkaline aqueous solution.

According to some of any of the embodiments described herein, the formulation further comprises one or more additional substances which may provide the formulation with additional properties as desired.

Such additional substances (ingredients, components) may include, for example, a thickening agent, a preservative (e.g., for in-can and dry film protection), a stabilizer (e.g., a dispersion stabilizer or a suspending agent), a plasticizer (e.g., as defined herein), an anti-foaming agent, an anti-oxidant, a UV stabilizer, a coalescence agent, an anti-sagging agent, and surface active agents (other than the emulsifying agent or system as described herein).

In some of any of the embodiments described herein, the formulation comprises a thickening agent, for providing the formulation with a viscosity that is suitable for its intended use and mode of application. Any of the commonly known thickening agents is contemplated. Representative examples include, but are not limited to, Guar gum, Xantan gum (E415), a hydroxyethyl Cellulose (for example, those marketed as Cellosize™ PCG-10; Cellosize™ QP 30000H; and Cellosize™ QP 100MH), a dydroxypropyl Methylcellulose (for example, those marketed as Methocel™ 40-0101; Methocel™ 856N; and Methocel™ K100M PRM), an ethylcellulose (for example, those marketed as ETHOCEL™ Std 45 Premium; and ETHOCEL™ Std 100 Premium), a cellulose gum (for example, those marketed as Walocel™ CRT 50000; and Walocel™ CRT 40000), a polyacrylate (for example, those marketed as ACRYSOL™ ASE-1000; ACRYSOL™ RM-5000; ACRYSOL™ SCT-275; and ACRYSOL™ RM-2020-E).

Other non-limiting examples include polysaccharides derived from brown algae such as alginic acid (E400), sodium alginate (E401), potassium alginate (E402), ammonium alginate (E403), calcium alginate (E404), polysaccharide derived from red seaweeds such as agar and agarose (E406), carrageenan (E407), natural gums from land plants such as arabinoxylan, cellulose and carboxymethylcellulose, curdlan, gellan gum (E418), gum arabic, starch, and locust bean gum (E410) which is a polysaccharides extracted from the carob tree seeds, pectin (E440) a polysaccharides extracted from apple or citrus fruits, and proteinous substances such as gelatin (E441) which is produced by partial hydrolysis of animal-derived collagen, and any combinations thereof and with other synthetic or mineral based substances suitable for use in food products.

In some embodiments, the formulation further comprises a thixotropic agent.

As used herein, a "thixotropic agent" refers to an agent which increases a viscosity of a liquid when added to a liquid. As known in the art "thixotropy" is a reversible behavior of viscous liquids (e.g., gels) that liquefy (e.g., exhibit reduced viscosity) when subjected to shear stress such as shaking or stirring, or otherwise disturbed.

A viscous liquid containing a thixotropic agent exhibits thixotropy, wherein the viscosity is reduced under stress (e.g., stirring, heating and/or application of shear forces). When a thixotropic agent is added to a formulation as described herein, the ingredients in a formulation can be readily mixed by stirring, as the viscosity is reduced during stirring, yet the viscosity of the formulation increases when stirring ceases, and as a result the formulation is relatively resistant to separation of components. Furthermore, the formulation can be applied under shear forces, which decrease the viscosity of the formulation and facilitate its application, yet, upon application, the viscosity of the formulation is reversed to provide a desired viscosity.

Examples of thixotropic agents suitable for use in the context of the present embodiments include, but are not limited to, amorphous silica such as fumed silica (available, for example as Aerosil® and Cab-O-Sil® products), kieselguhr, gums (e.g., xanthan gum, guar gum, locust bean gum, alginates), cellulose derivatives, starches, polymers (e.g., polyvinyl alcohol, polyacrylates, hydrophobically-modified polyacrylates), emulsifiers, and clay derivatives (e.g., amine treated magnesium aluminum silicate, bentonite colloidal silicic acid, white smectite clays and bleaching earth, attapulgite, mica, synthetic magnesium phyllosilicates (Laponite), layered silicates, modified smectites, hectorite, and sepiolite.

In exemplary embodiments, the thixotropic agent is a silica-containing thixotropic agent and in some embodiments it comprises highly amorphous silica, such as fumed silica.

An amount of the thixotropic agent, if present, ranges from 0.01 to 2, or from about 0.01 to about 1, or from about 0.05 to about 0.5, or from about 0.05 to about 2, or is about 0.1 weight percents of the total weight of the formulation, including any intermediate value.

Examples of de-foaming and/or antifoaming agents that are suitable for use in the context of the present invention, include, but are not limited to, oil emulsions, such as, for example, those marketed as Airase® 4500 (Air products), Airase® 4750V (Air products), Airase® 4800 (Air products), and Surfynol® DF-220 (Air products); polymeric defoamers such as, for example, those marketed as BYK®-011, BYK®-012, and BYK®-354, and silicone-based defoamers (e.g., polysiloxanes) such as, for example, those marketed as BYK® 024, BYK® 019, BYK®-021 and AF-52™.

Examples of preserving agents (preservatives) that are suitable for use in the context of the present invention, include, but are not limited to, formaldehyde and alkyl hydroxy benzoates; preferably the preserving agent is a mixture of methyl and propyl hydroxy benzoates. Exemplary preservatives are those marketed as Mergal® K14 (Troy; comprising isothiazolinone) and Acticide® MBS (Thor).

Examples of dispersing agents or dispersants include, but are not limited to, alcohol ethoxylates such as, for example, marketed as Tergitol® 15-S-20 (Dow), and alkyl sulfonates such as, for example, marketed as DeSulf DBS-60-T (Deforest Enterprises; triethanolamine dodecylbenzene sulfonate).

Suitable coalescence agents include those that are amphiphilic and can be dissolved both in an aqueous solution and in a polymer as described herein. Examples include, without limitation, N-Methyl-2-Pyrrolidone and the commercial product marketed as Dowanol*™ DM (2-(2-methoxyethoxy)ethanol; Dow).

Examples of UV stabilizers and anti-oxidants include, but are not limited to, benzotriazole-based UV absorbers such as marketed as Tinuvin® DW 99, triazine-based UV absorber, such as marketed as Tinuvin® DW 400 (2-hydroxy-phenyl-s-triazine), and those marketed as Tinuvin® 1130, Mayzo BLS® 99-2, Eversorb® ST14036, Eversorb® AQ6, NanoBYK® 3820, NanoBYK® 3840, NanoBYK® 3860, Tinuvin® DW 123, Mayzo BLS® 292, Mayzo BLS® 123, and Eversorb® AQ5.

Exemplary surface active agents usable in the context of the present embodiments include, for example, leveling agents and wetting agents, including, but are not limited to, silicon based materials such as, but not limited to, those marketed as BYK®-333, BYK®-348, BYK®-349 and BYK®-410, and silicon-free materials such as, but not limited to, those marketed as Deuteron® OG 863, Deuteron® OG 8670, BYK®-3410 and BYK®-DYNWET 800N.

Exemplary anti-sagging agents include, but are not limited to, a urea-modified Polyurethane such as marketed as BYK®-425, and sepiolite, such as marketed as Pangel® AD. In some of any of the embodiments described herein, the formulation is in a form of an aqueous suspension or dispersion, in which particles of the polymers are dispersed or suspended in the aqueous medium, whereby the surface active agent and optionally a stabilizer and a thixotropic agent, provide for the stability of the dispersion or suspension.

In some of any of the embodiments described herein, the formulation is devoid of (as defined herein) a pesticide such as, for example, an insecticide. In some of any of the embodiments described herein, the formulation is devoid of a substance that is toxic to the target pest (e.g., the target insect), as defined herein.

An exemplary formulation is described in the Examples section that follows.

Non-Aqueous Formulations:

According to an aspect of some embodiments of the present invention there is provided a formulation comprising a tacky polymer, as described herein in any of the respective embodiments and any combination thereof, and a thixotropic agent, as described herein in any of the respective embodiments and any combination thereof.

According to some embodiments of this aspect the present invention, the concentration of the thixotropic agent ranges from about 1 to about 10, or from about 1 to about, or from about 2 to about 6, or from about 3 to about 5, or from about 3.5 to about 4, or is about 3.85, percents by weight, of the total weight of the formulation.

According to some of any of the embodiments described herein for this aspect of the present invention, the formulation is devoid of an organic solvent, as defined herein.

According to some of any of the embodiments described herein for this aspect of the present invention, the formulation is devoid of (as described herein) water.

According to some of any of the embodiments described herein for this aspect of the present invention, the formulation is devoid of (as defined herein) a volatile substance.

Herein, the phrase "volatile substance" describes a material featuring a boiling temperature above 150° C.

According to some of any of the embodiments described herein for this aspect of the present invention, the formulation further comprises one or more additional agents as described herein in any of the respective embodiments. Exemplary such agents include, for example, a thickening agent, a preservative, an anti-foaming agent, an anti-oxidant, a UV stabilizer, a coalescence agent, and an anti-sagging agent, as these are described herein.

According to the present embodiments, a formulation as described herein as a "non-aqueous formulation" is for use in repelling a pest from a plant.

Properties and Configurations:

In some of any of the embodiments described herein, the formulation is characterized by tackiness of at least 400 N/m$^2$, for example, in a range of from about 480 N/m$^2$ to about 2400 N/m$^2$, when tackiness is determined as described herein.

In some of any of the embodiments described herein, a formulation according to any of the respective embodiments is characterized as highly durable.

By "durable" it is meant that the formulation maintains at least one activity feature for a prolonged time period, when exposed to environmental conditions.

According to the present embodiments, a prolonged time period is at least one month, and is preferably 2, 3, and even more months.

By "environmental conditions" it is meant temperature, light, humidity, precipitation, irrigation, and any other environmental condition the formulation (or an object to which it is applied) is exposed to. Such conditions depend on the geographical area and season at which the formulation is utilized, and this term encompasses all such conditions, including a temperature within a range of from −10° C. to 50° C.; humidity within a range of from 0 to 90%, any precipitation or from of irrigation, and sunlight at any wavelength, including UV.

In some of any of the embodiments described herein, the formulation is UV-durable, such that it maintains at least one activity feature for a prolonged time period, as defined herein, when exposed to UV radiation such as sunlight.

By "activity feature" it is meant a feature that provides the formulation with its utility. An activity feature of the formulations of the present embodiments encompasses tackiness, as defined herein. An activity feature according to the present embodiments further encompasses pest repellence (e.g., insect repellence) from an object (e.g., plant) as described herein.

In some of any of the embodiments described herein, a formulation of the present embodiments is non-phytotoxic.

Herein throughout, the term "non-phytotoxic", when recited for a substance or a formulation, refers to a substance or a formulation which, upon contacting a plant for a time period that is required for a certain application (e.g., as a pesticide or pest repellent), no observation of a harmful effect to the plant (e.g., a visual defect in the plant's trunk, leaves and/or fruits) is observed. In the context of embodiments of the present invention that relate to application of a substance or formulation to plants such as trees, this term encompasses, for example, no appearance of visual defects in the application site or its vicinity (e.g., throughout a tree trunk), during the time period in which the formulation or substance is applied. In some of any of the embodiments described herein, the formulation is packaged in a container configured for dispensing the formulation onto an object.

In some of any of the embodiments described herein there is provided a kit which comprises a formulation as described herein packaged in a container, and which can further comprise means for dispensing the formulation onto an object and/or instructions how to apply the formulation onto an object.

In some of any of these embodiments, the container can be a disposable container, or a non-disposable, possibly re-fillable, container.

In some embodiments, the means for dispensing the composition are configured for applying shear forces on the formulation, such that, when the formulation comprises a thixotropic agent, such means result is reduced viscosity of the formulation and facilitate its application.

In some embodiments, the formulation is intended for being applied by brushing or smearing the formulation on a surface of an object, and the container or kit comprises means for dispensing the application by brushing or smearing, for example, by using a brush, a sponge, or a dedicated nozzle that allows dispending the formulation from the container and smearing it on an object. In some of these embodiments, the container is a squeezable container.

In some embodiments, the kit further comprises means for applying the formulation to an object by brushing or smearing, such as a brush, a sponge, a wipe, or any other article for smearing the formulation.

In some embodiments, the kit comprises instructions to apply the formulation by brushing or smearing.

In some embodiments, the kit comprises instructions to shake the container or otherwise apply shear forces on the formulation, immediately before dispensing it from the container and/or immediately before applying it to an object, so as to reduce its viscosity (e.g., in case the formulation comprises a thixotropic agent, as described herein).

In some of any of the embodiments described herein, the formulation is configured for dispensing by spraying, and can also be referred to as a sprayable formulation.

In some of these embodiments, the container is a pressurized container, configured for dispensing the formulation by pumping in air or other propellant at superatmospheric pressure, or by using airless spraying equipment. Any known type of spraying equipment may be used. Particularly useful are containers configured for dispensing the formulation is a form of an aerosol.

In some of these embodiments, the spraying is a low-pressure spraying, which is effected at a pressure that ranges from about 1.5 PSI to about 9 PSI.

In some of these embodiments, the spraying is a high-pressure spraying, which is effected at a pressure that ranges from about 40 PSI to about 200 PSI.

An exemplary such configuration is presented in FIG. 1, showing a pressurized tank (container) or pump, containing a formulation as described herein, having a sprayer connected thereto and configured for dispensing the formulation is a form of a spray onto an area to be treated (exemplified in FIG. 1 as a tree trunk).

In some embodiments, the formulation is an aerosol formulation, which further comprises a propellant. In some of these embodiments, the propellant is a non-organic propellant such as, for example, carbon dioxide, nitrous oxide, argon, nitrogen, oxygen and mixtures thereof, such as for example, air. In some of these embodiments, the propellant is a water-soluble propellant, such as, but not limited to, dimethyl ether.

In some of any of the embodiments described herein, the formulation is configured for dispensing by brushing or smearing. An exemplary such configuration is presented in FIG. 2, showing application of the formulation by smearing, using a sponge.

According to some embodiments of the present invention, when a formulation is configured for dispensing via a certain application mode, the formulation is designed such that it suits the intended configuration (the intended application mode).

In some embodiments, a suitability of a formulation to an intended application mode is by exhibiting a rheology profile and/or viscosity that is desirable for providing a formulation that can be applied to an object without dripping, so as to assure that the resulting polymeric film is formed where desired.

For example, when a formulation is an aqueous formulation as described herein in any of the respective embodiments, and is configured for dispensing by smearing or brushing (as exemplified, in a non-limiting way, in FIG. 2), the formulation is designed, in terms of, for example, the concentration and/or type of its ingredients, such that it exhibits a rheology profile and/or viscosity that is suitable for efficient application to a desired site (e.g., application to a tree trunk while applying respective shearing forces and without dripping).

When a formulation is an aqueous formulation as described herein in any of the respective embodiments, and is configured for dispensing by spraying (as exemplified, in a non-limiting way, in FIG. 1), the formulation is designed, in terms of, for example, the concentration and/or type of its ingredients, such that it exhibits a rheology profile and/or viscosity that is suitable for efficient application to a desired site (e.g., application to a tree trunk while applying respective shearing forces without dripping).

For example, when a formulation is a non-aqueous formulation as described herein in any of the respective embodiments, and is configured for dispensing by smearing or brushing, the formulation is designed, in terms of, for example, the concentration and/or type of its ingredients, such that it exhibits, upon application of shearing forces by the brushing or smearing, a viscosity that is suitable for efficient application to a desired site (e.g., application to a tree trunk without dripping).

When a formulation is a non-aqueous formulation as described herein in any of the respective embodiments, and is configured for dispensing by spraying, the formulation is designed, in terms of, for example, the concentration and/or type of its ingredients, such that it exhibits, upon application of shearing forces during aerosol formation, a viscosity that is suitable for efficient application to a desired site (e.g., application to a tree trunk without dripping).

It is to be noted that the non-aqueous formulations of the present embodiments comprise a thixotropic agent and hence the viscosity of such formulations changes upon application of shear forces. Such formulations are therefore preferably designed to exhibit a viscosity that is suitable to the application mode upon application of shear forces (and not upon preparation).

In some of any of the embodiments described herein, an aqueous formulation as described herein in any one of the present embodiments and any combination thereof, when configured for application via brushing or smearing, is characterized by a viscosity that ranges from about 15000 to about 40000, or from about 20000 to about 40000 centipoises.

In some of these embodiments, the aqueous formulation comprises 50-70, preferably 60-70, weight percents of a tacky polymeric composition, as described herein, 3-7 weight percents of an emulsifying agent or system, with the balance being water and optionally a pH adjusting agent and/or any of the other additional substances as described herein.

In some of any of the embodiments described herein, an aqueous formulation as described herein in any one of the present embodiments and any combination thereof, when configured for application via spraying at low pressure (e.g., as defined hereinabove), is characterized by a viscosity that ranges from about 100 to about 3000, or from about 500 to about 3000 centipoises.

In some of any of the embodiments described herein, an aqueous formulation as described herein in any one of the present embodiments and any combination thereof, when configured for application via spraying at high pressure (e.g., as defined hereinabove), is characterized by a viscosity that ranges from about 3000 to about 15000 centipoises.

In some of these embodiments, the aqueous formulation comprises 50-70, preferably 40-50 weight percents of a tacky polymeric composition for low pressure application and 50-75 weight percent of a tacky polymeric composition for high pressure application, as described herein, 6-15 weight percents of an emulsifying agent or system, with the balance being water and optionally a pH adjusting agent and/or any of the other additional substances as described herein In some of any of the embodiments described herein, a non-aqueous formulation as described herein in any one of the present embodiments and any combination thereof, when configured for application via brushing or smearing, is characterized by a viscosity that ranges from about 2000 to about 40000 centipoises. In some embodiments, the formulation is characterized by a viscosity that ranges from about 2000 to about 10000 centipoises (that is, a relatively low viscosity). In some embodiments, the formulation is characterized by a viscosity that ranges from about 15000 to about 40000 centipoises (that is, a relatively high viscosity). Without being bound by any particular theory, it is assumed that a non-aqueous formulation as described herein can be applied by brushing or smearing while exhibiting a wide range of viscosities, due to its thixotropic nature.

In some of these embodiments, the non-aqueous formulation comprises from 80 to 95 weight percents of a tacky polymeric material, as described herein, from 5 to 10 weight percents of a thixotropic agent, as described herein, and from 5 to 10 weight percents of a tackifying agent and/or plasticizer, as described herein.

In some of any of the embodiments described herein, a non-aqueous formulation as described herein in any one of the present embodiments and any combination thereof, when configured for application via spraying (preferably at high pressure, e.g., as defined herein), is characterized by a viscosity that ranges from about 2000 to about 10000 centipoises.

In some of these embodiments, the non-aqueous formulation comprises from 80 to 95 weight percents of a tacky polymeric material, as described herein, from 5 to 10 weight percents of a thixotropic agent, as described herein, and from 5 to 10 weight percents of a tackifying agent and/or plasticizer, as described herein.

In some of any of the embodiments described herein for a non-aqueous formulation, the tacky polymeric composition comprises a tacky polymeric material and a tackifying agent and/or plasticizer, and the composition (e.g., the type of the tacky polymeric material and/or the type of the tackifying agent and/or plasticizer) is selected to provide the indicated viscosity as delineated herein for an indicated application mode. For example, when the formulation is configured for application by high-pressure spraying, a tacky polymeric material which features a relatively low viscosity is selected.

In some embodiments, a viscosity of a formulation is determined by a Brookfield viscometer, spindle LV1,2,3,4, operated at 3,6,12,20,30,60 rpm, at room temperature (e.g., 23° C.), and according to AS™ D 2556-93A.

In some embodiments, a viscosity of a formulation is determined by a Brookfield viscometer, spindle LV4, operated at 20 rpm, at 23° C., and according to AS™ D 2556-93A.

Pest Repelling:

The formulation as described herein in any of the respective embodiments is usable as a pest repellent, or is for use in repelling insect pest from an object.

According to an aspect of some embodiments of the present invention there is provided a method of repelling insect pest from an object, the method comprising applying a formulation as described herein in any of the respective embodiments and any combination thereof on or near at least a portion of the object.

Herein throughout, the terms "repellent", "repelling", "repellency", and any other grammatical diversion of "repel" are used to describe a function due to which a pest spends less time (including no time) in or on a target object than in or on a non-target object. Thus, to repel a target pest means deterring the pest from remaining in a target object. "Repel" may also include killing the target pest. "Repel" may also be used to refer to slowing the behavior and/or responsiveness of a target pest so that the presence of the target pest is less of a nuisance to the target pest. "Repel" also includes minimizing the presence of the target pest on or in a target object, including entry of the target pest into building structures or climbing/landing of the target pest on the target object. "Repel" also encompasses slowing the movement of a target pest on or near a target object by "trapping" a pest, and preventing other pests from nearing the target object.

In some embodiments, repelling insect pest from an object comprises deterring the pest from contacting and/or remaining in or on a target object.

In some embodiments, repelling a pest from an object comprises preventing or reducing infestation of the object by the pest.

In some embodiments, the repelling effect of the formulation of the present embodiments is due to its tackiness.

Applying the formulation can be effected by contacting the formulation with at least a portion of the object (e.g., a surface of the object or a portion thereof) or with an area near the object (e.g., surrounding the object). The contacting can be effect by brushing, smearing, spraying, as described herein, or by any other suitable application forms known in the art.

The area on which the formulation is applied is also referred to herein as the target area, whereby "object" refers to an object which is prone to infestation by the pest.

As used herein, the term "pest" describes any animal species which is harmful to humans and/or animals, including species which cause economic damage (e.g., to agricultural substrates such as plants, crops, stored food or other products), species which cause damage to structural objects (e.g., to buildings, houses, vehicles and the like), species which cause harm to health (e.g., by transmitting disease or causing allergies), pain, itching or other physical discomfort (e.g., by stinging or biting), and/or psychological discomfort (e.g., fear and/or disgust).

In some embodiments, the pest is an invertebrate, for example, an arthropod, mollusk (e.g., snail, slug) or worm (e.g., a nematode). In some embodiments, the pest is an arthropod.

Herein and in the art, the term "arthropod" refers to invertebrates characterized by an external skeleton, a segmented body and jointed appendages, and includes insects, arachnids (e.g., spiders, scorpions, harvestmen, ticks, mites, solifuges), myriapods (e.g., millipedes, centipedes), and crustaceans (e.g., woodlice, crabs, lobsters, crayfish, shrimp, krill, barnacles).

Examples of arthropod pests according to some embodiments of the invention include, without limitation, fleas, ants, cockroaches, beetles (e.g., weevils, flour beetles, wireworms, *Oryzaephilus* spp., *Rhizopertha dominica*), aphids, phylloxera, whiteflies, scale insects (e.g., mealybugs), thrips, earwigs, silverfish, flies (e.g., black flies, fruit flies), lice, midges, mosquitoes, gnats (e.g., fungus gnats), lepidopterans (e.g., moths, butterflies), bedbugs, cicadas, crickets, grasshoppers, leafhoppers, termites, wasps (e.g., hornets, yellow jackets), bees, centipedes, millipedes, spiders, ticks, mites, chiggers, scorpions, woodlice (e.g., pillbugs, sowbugs) and the like, including larval forms thereof (e.g., maggots, grubs, caterpillars). Exemplary pests include lice (e.g., infesting an animate subject) and cockroaches, flies, spiders, and ants (e.g., infesting an inanimate object).

In some of any of the embodiments described herein, the pest is an insect.

As used herein, the term "insect" refers to the insect which is to be repelled from an object, unless otherwise indicated, and such an insect is also referred to herein as a "target insect".

The term "insect" describes a class of invertebrate arthropods that have a chitinous exoskeleton, a three-part body (head, thorax and abdomen), three pairs of jointed legs, compound eyes and one pair of antennae, and encompass, for example, ants, termites, swaps, mosquitoes, flies beetles, gnats, ticks, beer bugs, fleas, lice, bed bugs, earwigs, cockroaches, aphids, spruce bud worm, corn borers, sandfleas, tsetse flies, mites, assassin bugs and the like.

In some embodiments, the insect is a social (eusocial) insect, which leaves in an organized colony. Social insects are known for being capable to communicate with one another, typically via pheromones or other chemical substances, but also via sounds or light.

In some embodiments, a repellent effect of a formulation as described herein is based on communicating an insecure sensation upon contacting the formulation, which deters subsequent attempts of contacting the object to which the formulation is applied.

In some embodiments, the target insect is a social insect such as ants, wasps and termites.

The terms "ant" and "wasp" describe ant and wasp members of the order Hymenoptera. Representative examples include, without limitation, the species *Iridomyrmex humilis, Solenopsis xyloni, Formica* spp. (ants), *Vespa vulgaris* (wasps) and the like.

The term "termite" describes the termite members of the order Isoptera. Representative examples include, without limitation, the species *Reticulitermes hesperus, Zootermopsis augusticollis, Kalotermes minor*, and the like.

As used herein, target areas include, but are not limited to, areas on humans, animals, birds, plants, crops, trees, soils, fields, greenhouses, barns granaries, homes, decks, pools, commercial buildings, clothing, tents, shoes, boots, blankets, sleeping bags, backpacks, table cloths, picnic tables, roofs, airplane hangars, antennas, parabolic antennas and reflectors, solar heaters, ventilation ducts, air conditioners, roofing beams, window ledges, sheds and other buildings, and exposed electrical installations such as power lines and transformers at airports and in warehouses, and anywhere else, and the like. Animals include but are not limited to domestic animals, farm animals, wild animals, pets, and zoo animals.

In general, a target area, to which the formulation is applied, includes animate and/or non-animate objects or a portion thereof, preferably a surface or a portion of the surface of the object, and/or the object's surrounding or a portion thereof.

The object is an object that is prone to pest (e.g., insect) infestation, that is, to be contacted by the pest in an adverse manner, and which repelling the pest therefrom is desirable.

The object is variable, and is determined by the site where repellency of a pest is desired or required.

In exemplary embodiments, the pest (e.g., insect) is an ant, a wasp or a termite, and the object is a home, or of a warehouse, or of a storage container (e.g., food storage container). In these embodiments, the formulation can be applied in a surrounding of the object, preferably near an entrance or an opening of the object, so as to repel the insect from the object and avoid its entrance thereto.

In exemplary embodiments, the object is a yard, a garden, an agricultural field, and the like, and the formulation can be applied around the object.

In exemplary embodiments, the object is a plant, and in some embodiments it is an agricultural crop. In these embodiments, the formulation can be applied to a portion of the plant or a soil surrounding the plant.

Herein, the term "plant" includes any or all of the physical parts of a plant, including trunk, seeds, seedlings, saplings, roots, tubers, stems, stalks, foliage, and fruits.

In some embodiments, the plant is a tree. In some embodiments, the tree is aged at least month.

The control of pests such as insects is important in achieving high crop efficiency. Damage by pests growing and stored agronomic crops can cause significant reduction in productivity and thereby result in increased costs to the consumer. The control of pests in forestry, greenhouse crops, ornamentals, nursery crops, stored food and fiber products, livestock, household, turf, wood products, and public and animal health is also important.

For example, it is well known that ants are a serious pest of a number of agricultural crops. The deleterious action of the ants can be direct (i.e., leaf cutting ants) or indirect. The indirect deleterious action of ants occurs, for example, in that certain species tend homopterous honey-dew-producing insects such as aphids, soft scales, and mealybugs. Through their transporting of these homopterous insects to new growth on the plants, and through their role in warding off potential parasites and predators, ants may create situations where the tended insects assume serious pest status, whereas, in the absence of ants, the insects would often be regulated through the action of beneficial predatory and parasitic species. Exemplary agricultural crop where ants are a serious pest are citrus trees where the ants move from the ground up to the tree to the leaves where they tend homopterous honey-dew-producing insects. Thus, in this situation, the object from which acts should be repelled is the tree itself.

In some embodiments, an object is or comprises wood.

In some embodiments, the formulation is applied to a target area as defined herein such that a film is formed at the application site.

In some embodiments, a thickness of a dry film formed upon application of a formulation as described herein ranges from 5 microns to 10 mm, including any intermediate subranges and values therebetween.

By "dry film" it is meant a film formed upon water and any other optional volatile substances, if present in the formulation, evaporate.

The dimensions and shape of the film are determined per the target area.

For example, when the object is a tree, the formulation can be applied as a ring or and/or around the tree trunk. The width of the ring can be from one cm to 100 cm, or, for a non-limiting example, from 1 to 15 (e.g., about 5 cm), including any intermediate subranges and values therebetween. When applied on the tree trunk, the ring can be applied to the tree trunk at a height of from a few cm from the ground and up to the first branch split (e.g., up to one meter from the ground).

In some embodiments, the formulation is applied to a target area at a repellency effective amount respective to the target insect.

The term "repellency effective amount", as used herein, means a minimum amount of the formulation which repels, or substantially prevents the insect from invading the object, when compared to the same area or object which is untreated. The amount needed can vary in accordance with the repellent formulation used; the type of area or object to be treated; the number of days of repellency needed; and the environment in which the area or object is located. The precise amount of repellent needed can easily be determined by one having ordinary skill in the art given the teachings of the instant application. In the Examples section that follows, typical concentrations needed to repel ants from trees are exemplified.

In some of any of the embodiments described herein, an amount of an aqueous formulation as described herein which is applied by brushing or smearing ranges from 0.01 to 1, or from 0.01 to 0.5, or from 0.05 to 0.5, or from 0.1 to 0.25, or from 0.05 to 0.2, or from 0.15 to 0.2 grams, per square cm of the object's surface (e.g., a tree trunk).

In some of any of the embodiments described herein, an amount of an aqueous formulation as described herein which is applied by spraying ranges from 0.05 to 5, or from 0.05 to 0.4, or from 0.05 to 0.3 or from 0.08 to 0.3 grams, per square cm of the object's surface (e.g., a tree trunk).

Without being bound by any particular theory, it is assumed that since for application of an aqueous formulation as described herein by spraying it is preferably to use a formulation comprising a lower concentration of a tacky polymeric material (e.g., as described hereinabove), an amount of the applied formulation is higher, compared to a formulation applied by brushing or smearing.

In some of any of the embodiments described herein, an amount of a non-aqueous formulation as described herein which is applied by brushing or smearing ranges from 0.01 to 0.2, or from 0.01 to 0.15, or from 0.02 to 0.15, or from 0.04 to 0.15 grams, per square cm of the object's surface (e.g., a tree trunk).

In some of any of the embodiments described herein, an amount of a non-aqueous formulation as described herein which is applied by spraying ranges from 0.01 to 0.2, or from 0.01 to 0.15, or from 0.02 to 0.15, or from 0.04 to 0.15 grams, per square cm of the object's surface (e.g., a tree trunk).

In some of any of the embodiments described herein, an amount of a formulation to be applied to an object's surface is such that provides for at least 0.02 grams, or at least 0.03 grams, or at least 0.04 grams, or at least 0.05 grams, or at least 0.08 grams, of a tacky polymeric composition as described herein per square cm of the object's surface. In some embodiments, an amount of a formulation to be applied to an object's surface is such that provides an amount of a tacky polymeric composition as described herein per square cm of the object's surface that ranges from about 0.04 grams to about 0.2 grams, or from about 0.04 grams to about 0.15 grams, or from about 0.05 grams to about 0.15 grams, or from about 0.05 grams to about 0.12 grams, or from about 0.08 grams to about 0.12 grams, per square cm of the object's surface.

In some embodiments, the formulation is applied in an amount which is non-phytotoxic to the plant object.

In some of any of the embodiments described herein, the object or the area to be treated is situated outdoors, and is exposed to environmental (e.g., weather) conditions such as sunlight, heat, cold, humidity and precipitations.

Typically, currently known repellent compositions used to treat outdoors objects or areas require higher amounts or concentration of the formulation or repeated applications, since the composition decomposes or detaches from the target area, or otherwise features reduced repellent activity over time.

In contrast, in some embodiments, a formulation as described herein forms, upon its application, a film which is characterized as remaining adhered to the surface for at least one month, also when subjected to environmental conditions as described herein.

In some embodiments, a method as described herein comprises re-applying the formulation after a first time period, and the first time period is at least 1 month, or at least two months, and can be also three months or more.

In some embodiments, re-applying is repeatedly effected after a second, third, fourth and so forth, time periods, as needed, and the time intervals between repeated applications are each at least 1, 2, 3, or more months.

In some embodiments, the object is a plant, and application of the formulation is effected once or twice per the plant's growth season. By "growth season" or "growing season" it is meant a time period during which local weather conditions (i.e. precipitations and/or temperature) permit normal plant growth. A "growing season", for example, is a time period at which fruits or flowers of a plant grow.

It is expected that during the life of a patent maturing from this application many relevant tacky polymers and/or surface active agents and/or thixotropic agents will be developed and the scope of the terms tacky polymer, surface active agent, and thixotropic agent is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

100 grams of an aqueous-based ant repellent was prepared by grinding and mixing (by means of high shear forces in a hand mix dissolver) the following ingredients:

67 grams polybutene, MW=2500 Daltons, obtained from H-2100;

3.93 grams Branched oxoalcohol C11 with 5 mol EO (CAS No. 127036-24-2); and 1.14 grams Oleic acid by Sigma Aldrich, and thereafter adding to the mixture 25.17 grams water, gradually, during about 10 minutes.

To the resulting dispersion, an anti-foaming agent (0.33 gram), a preservative (0.33) gram and fumed silica (Cab-O-sil 5) (2 grams), were added, gradually, during 15 minutes.

Finally, a 50% sodium bicarbonate solution was added (about 0.1 gram) until a pH of 6.5-6.8 is achieved.

The obtained formulation, in a form of dispersion, is odorless and transparent.

Viscosity of the obtained formulation was measured using a Brookfield viscometer, spindle LV4, operated at 20 rpm, at 23° C., according to AS™ D 2556-93A.

The formulation exhibits a viscosity of 20,000 centipoises, when measured as described hereinabove.

Tackiness was measured according to the AS™ 6195-03 loop tack test.

In brief, the loop tack test is performed using a tensile machine. As a sample, LDPE film, being 25 mm in width and 175 mm in length is used (as shown in FIG. 3A), and is contacted with a galvanized stainless steel plate coated by 25×100 mm of the aqueous-based ant repellent formulation, as shown in FIG. 3B, to full cover (25 mm×25 mm). The test is performed at a speed of 300 mm/minutes. The entire test system is shown in FIG. 3C. The recorded force, as measured in this test, was 0.3-1.5 N, for a sample featuring dimensions as indicated.

These data indicate that a strength required for peeling the film formed by the tested formulation, which reflects its tackiness, as measured in this test, is 480-2400 N/m².

Example 2

The formulation described in Example 1 above was applied to several tree species, as detailed in Table 2 below, by forming a ring featuring a height of about 5-10 cm around the tree trunk, at least 1 meter from ground level or at the highest point of trunk before the first branching or on each of the lowest branches right after the first branching.

Observations regarding durability and ant-repellency were made during different time periods. The tested trees were exposed to sunlight and precipitation during the test. Ant repellency was observed during the tested period in all tested species (while it is noted that non-treated trees in the same orchard were infested by ants). No phytotoxicity was observed in older trees, while partial phytotoxicity was observed in young Avocado trees.

The obtained data is presented in Table 2 below.

As can be seen, in almost all tested plant species an amount of 500-2000 grams per one square meter, (e.g., of about 1500 grams per 1 square meter) was applied as a ring of 5-10 cm width around the tree trunk.

TABLE 2

| Species | Age | No. | Trunk Circumference (cm) | Amount of Applied Formulation (grams) | Height of Applied Formulation (cm) | durability | toxicity |
|---|---|---|---|---|---|---|---|
| Avocado (planted two years ago) | 2 weeks | 4 | 3 | 9 | 5 | Durable for at least 2 months | Partially phytotoxic |
| Persimmon | 2 years | 4 | 30 | 60 | 7 | Durable for at least one month | Partially phytotoxic |
| Citrus (Var. Or) | 2 years | 5 | 30 | 25 | 10 | Durable for at least 7 months | Non-phytotoxic |
| Citrus (Var. Orange) | 2-14 years | 5 | 30 | 35 | 10 | Partially durable after 3 months | Non-phytotoxic |
| Pomegranate | 2 years | 4 | 30 | 35 | 7 | Durable for at least 6 months | Non-phytotoxic |

Exemplary photographs of a Lemon tree and a Persimmon tree, upon application of an exemplary formulation of the present embodiments, are presented in FIGS. 4A-C.

All treated trees remained ants-free for the period of 10 months. The treated surfaces remained tacky with no melting when exposed to the summer heat and no washing when exposed to rain.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A formulation comprising a tacky polymeric composition, an emulsifying agent or system and water, wherein:
    an amount of said tacky polymeric composition is at least 40 weight percent of the total weight of the formulation;
    said tacky polymeric composition is characterized by tackiness of at least 400 N/m²;
    an amount of said water ranges from 20 to 30 weight percent of the total weight of the formulation; and
    a weight ratio of said tacky polymeric composition and said emulsifying agent or system is at least 10:3, the formulation being devoid of an organic solvent.

2. The formulation of claim 1, wherein said tacky polymeric composition comprises or consists of a tacky polymer.

3. The formulation of claim 2, wherein said tacky polymer is a polyolefin.

4. The formulation of claim 3, wherein said polyolefin is a polybutene.

5. The formulation of claim 1, wherein said tacky polymeric composition is characterized by tackiness of at least 480 N/m$^2$.

6. The formulation of claim 1, wherein an amount of said emulsifying agent or system ranges from 0.1 to 27 weight percent, of the total weight of the formulation.

7. The formulation of claim 1, wherein said emulsifying agent or system features an HLB value lower by at least 5% or by at least 10%, or by at least 20%, from the HLB value required for forming a stable formulation of said tacky polymeric composition and water.

8. The formulation of claim 1, wherein said emulsifying agent or system features an HLB value lower than 15.

9. The formulation of claim 1, wherein said emulsifying agent or system is non-phytotoxic.

10. The formulation of claim 1, further comprising a thixotropic agent.

11. A method of repelling a pest from an object, the method comprising applying the formulation of claim 1 on a surface of the object and/or near at least a portion of the object.

12. The method of claim 11, wherein the pest is an insect.

13. The method of claim 12, wherein said insect is a social insect.

14. The method of claim 11, wherein said object is a plant.

15. The method of claim 14, wherein said object is a tree.

16. The method of claim 11, further comprising re-applying the formulation after a first time period, said first time period being at least 1 month.

* * * * *